United States Patent
Meiri et al.

(10) Patent No.: US 11,675,673 B2
(45) Date of Patent: Jun. 13, 2023

(54) SYSTEM AND METHOD FOR PROMOTING FRACTURED VOLUMES

(71) Applicant: EMC IP Holding Company, LLC, Hopkinton, MA (US)

(72) Inventors: David Meiri, Somerville, MA (US); Dmitry Tylik, Westborough, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 108 days.

(21) Appl. No.: 17/068,928

(22) Filed: Oct. 13, 2020

(65) Prior Publication Data

US 2022/0114061 A1 Apr. 14, 2022

(51) Int. Cl.
*G06F 11/14* (2006.01)
*G06F 3/06* (2006.01)

(52) U.S. Cl.
CPC .......... *G06F 11/1469* (2013.01); *G06F 3/065* (2013.01); *G06F 3/0619* (2013.01); *G06F 3/0644* (2013.01); *G06F 3/0673* (2013.01); *G06F 2201/82* (2013.01); *G06F 2201/84* (2013.01)

(58) Field of Classification Search
CPC .. G06F 11/1469; G06F 3/0619; G06F 3/0644; G06F 3/065; G06F 3/0673; G06F 2201/82; G06F 2201/84
See application file for complete search history.

(56) References Cited

U.S. PATENT DOCUMENTS

| | | | | |
|---|---|---|---|---|
| 6,658,540 B1* | 12/2003 | Sicola | ................ | G06F 11/2007 707/999.204 |
| 10,261,690 B1* | 4/2019 | Shalev | ................ | G06F 3/0659 |
| 10,437,478 B1* | 10/2019 | Ballard | ................ | G06F 3/065 |
| 2009/0106405 A1* | 4/2009 | Mazarick | ............ | G06F 9/5077 709/222 |
| 2012/0192006 A1* | 7/2012 | Qi | ...................... | G06F 11/2071 714/E11.089 |
| 2014/0310441 A1* | 10/2014 | Klughart | ............ | G06F 13/4072 710/301 |
| 2020/0037209 A1* | 1/2020 | Mihály | ............... | H04L 67/1021 |

* cited by examiner

*Primary Examiner* — Jigar P Patel
(74) *Attorney, Agent, or Firm* — Brian J. Colandreo; Heath M. Sargeant; Holland & Knight LLP (57) ABSTRACT

A method, computer program product, and computing system for identifying a replication link failure between a first volume of a first storage array and a second volume of a second storage array, wherein a first storage protocol identifier is associated with each of the first volume and the second volume. One of the first volume and the second volume may be defined as inaccessible and the other of the first volume and the second volume as accessible, thus defining an inaccessible volume and an accessible volume. The first storage protocol identifier associated with the inaccessible volume may be replaced with a second storage protocol identifier. Access to the inaccessible volume may be provided via the second storage protocol identifier.

12 Claims, 7 Drawing Sheets

SYSTEM AND METHOD FOR PROMOTING FRACTURED VOLUMES

BACKGROUND

Storing and safeguarding electronic content may be beneficial in modern business and elsewhere. Accordingly, various methodologies may be employed to protect and distribute such electronic content.

A volume may be configured to be an active/active volume that is accessible from any storage array of a storage cluster. An active/active volume may include a volume replicated on and accessible by each storage array of a storage cluster. For example, a first volume of a first storage array and a second volume of a second storage array may be maintained to be identical.

In some implementations, host servers can read and write to each storage array of the storage cluster. Any write operation to a volume on one storage array may be replicated to the corresponding volume(s) on the other storage array(s) synchronously, while a read operation on the volume can be serviced by the storage array receiving the read command (i.e., "active/active"). In some implementations, each volume may expose the same Small Computer System Interface (SCSI) image at each storage array, including a SCSI ID (a world-wide unique identifier), so that a host does not see multiple storage arrays but may see a more recognizable multi-pathing setup with a single volume. In this manner, the volume may be "stretched" across multiple storage arrays.

However, when links break or fail between storage arrays, conventional approaches sever the connection between the two copies of the volume as it could be disastrous to continue to service IO operations from both copies to hosts. For example, any write to one copy of the volume is no longer replicated to its peer. In this manner, the volume becomes "fractured" with an accessible copy and an inaccessible copy. Conventional approaches to this challenge designate one storage array as the "winner", enabling it to continue to service IO operations, while the other storage array, the "loser", remains with a frozen, inaccessible copy of the volume.

Even though the volume may be split into two divergent copies, both copies may be configured to carry the same storage protocol identifier. As such, it may be dangerous to expose different data through the same storage protocol identifier, since any host that manages to access both divergent copies of the data may get a corrupted view of the volume and may execute write operations that will permanently corrupt the data. As such, according to conventional approaches, it may be difficult to verify that none of the hosts previously connected to the storage array are still connected to the "winner" and the "loser" storage arrays.

SUMMARY OF DISCLOSURE

In one example implementation, a computer-implemented method executed on a computing device may include, but is not limited to, identifying a replication link failure between a first volume of a first storage array and a second volume of a second storage array, wherein a first storage protocol identifier is associated with each of the first volume and the second volume. One of the first volume and the second volume may be defined as inaccessible and the other of the first volume and the second volume as accessible, thus defining an inaccessible volume and an accessible volume. The first storage protocol identifier associated with the inaccessible volume may be replaced with a second storage protocol identifier. Access to the inaccessible volume may be provided via the second storage protocol identifier.

One or more of the following example features may be included. The second storage protocol identifier may be predefined and one or more storage protocol paths referenced by the second storage protocol identifier may be generated. Providing access to the inaccessible volume via the second storage protocol identifier may include identifying a replication link recovery between the inaccessible volume and the accessible volume, receiving a selection of one of the inaccessible volume and the accessible volume for synchronizing data to the other of the inaccessible volume and the accessible volume, and associating each of the inaccessible volume and the accessible volume with one of the first storage protocol identifier and the second storage protocol identifier based upon, at least in part, the selection of one of the inaccessible volume and the accessible volume. Receiving a selection of one of the inaccessible volume and the accessible volume for synchronizing data to the other of the inaccessible volume and the accessible volume may include receiving a selection of the accessible volume for synchronizing data to the inaccessible volume. Associating each of the inaccessible volume and the accessible volume with one of the first storage protocol identifier and the second storage protocol identifier based upon, at least in part, the selection of one of the inaccessible volume and the accessible volume may include restoring the inaccessible volume from a snapshot, replacing the second storage protocol identifier associated with the inaccessible volume with the first storage protocol identifier, and synchronizing data from the accessible volume to the inaccessible volume. Receiving a selection of one of the inaccessible volume and the accessible volume for synchronizing data to the other of the inaccessible volume and the accessible volume may include receiving a selection of the inaccessible volume for synchronizing data to the accessible volume. Associating each of the inaccessible volume and the accessible volume with one of the first storage protocol identifier and the second storage protocol identifier based upon, at least in part, the selection of one of the inaccessible volume and the accessible volume may include replacing the first storage protocol identifier associated with the accessible volume with the second storage protocol identifier, and synchronizing data from the inaccessible volume to the accessible volume.

In another example implementation, a computer program product resides on a computer readable medium that has a plurality of instructions stored on it. When executed by a processor, the instructions cause the processor to perform operations that may include, but are not limited to, identifying a replication link failure between a first volume of a first storage array and a second volume of a second storage array, wherein a first storage protocol identifier is associated with each of the first volume and the second volume. One of the first volume and the second volume may be defined as inaccessible and the other of the first volume and the second volume as accessible, thus defining an inaccessible volume and an accessible volume. The first storage protocol identifier associated with the inaccessible volume may be replaced with a second storage protocol identifier. Access to the inaccessible volume may be provided via the second storage protocol identifier.

One or more of the following example features may be included. The second storage protocol identifier may be predefined and one or more storage protocol paths referenced by the second storage protocol identifier may be generated. Providing access to the inaccessible volume via the second storage protocol identifier may include identifying a replication link recovery between the inaccessible volume and the accessible volume, receiving a selection of one of the inaccessible volume and the accessible volume for synchronizing data to the other of the inaccessible volume and the accessible volume, and associating each of the inaccessible volume and the accessible volume with one of the first storage protocol identifier and the second storage protocol identifier based upon, at least in part, the selection of one of the inaccessible volume and the accessible volume. Receiving a selection of one of the inaccessible volume and the accessible volume for synchronizing data to the other of the inaccessible volume and the accessible volume may include receiving a selection of the accessible volume for synchronizing data to the inaccessible volume. Associating each of the inaccessible volume and the accessible volume with one of the first storage protocol identifier and the second storage protocol identifier based upon, at least in part, the selection of one of the inaccessible volume and the accessible volume may include restoring the inaccessible volume from a snapshot, replacing the second storage protocol identifier associated with the inaccessible volume with the first storage protocol identifier, and synchronizing data from the accessible volume to the inaccessible volume. Receiving a selection of one of the inaccessible volume and the accessible volume for synchronizing data to the other of the inaccessible volume and the accessible volume may include receiving a selection of the inaccessible volume for synchronizing data to the accessible volume. Associating each of the inaccessible volume and the accessible volume with one of the first storage protocol identifier and the second storage protocol identifier based upon, at least in part, the selection of one of the inaccessible volume and the accessible volume may include replacing the first storage protocol identifier associated with the accessible volume with the second storage protocol identifier, and synchronizing data from the inaccessible volume to the accessible volume.

In another example implementation, a computing system includes at least one processor and at least one memory architecture coupled with the at least one processor, wherein the at least one processor is configured to identify a replication link failure between a first volume of a first storage array and a second volume of a second storage array, wherein a first storage protocol identifier is associated with each of the first volume and the second volume, wherein the at least one processor is further configured to define one of the first volume and the second volume as inaccessible and the other of the first volume and the second volume as accessible, thus defining an inaccessible volume and an accessible volume, wherein the at least one processor is further configured to replace the first storage protocol identifier associated with the inaccessible volume, with a second storage protocol identifier, and wherein the at least one processor is further configured to provide, via the second storage protocol identifier, access to the inaccessible volume.

One or more of the following example features may be included. The second storage protocol identifier may be predefined and one or more storage protocol paths referenced by the second storage protocol identifier may be generated. Providing access to the inaccessible volume via the second storage protocol identifier may include identifying a replication link recovery between the inaccessible volume and the accessible volume, receiving a selection of one of the inaccessible volume and the accessible volume for synchronizing data to the other of the inaccessible volume and the accessible volume, and associating each of the inaccessible volume and the accessible volume with one of the first storage protocol identifier and the second storage protocol identifier based upon, at least in part, the selection of one of the inaccessible volume and the accessible volume. Receiving a selection of one of the inaccessible volume and the accessible volume for synchronizing data to the other of the inaccessible volume and the accessible volume may include receiving a selection of the accessible volume for synchronizing data to the inaccessible volume. Associating each of the inaccessible volume and the accessible volume with one of the first storage protocol identifier and the second storage protocol identifier based upon, at least in part, the selection of one of the inaccessible volume and the accessible volume may include restoring the inaccessible volume from a snapshot, replacing the second storage protocol identifier associated with the inaccessible volume with the first storage protocol identifier, and synchronizing data from the accessible volume to the inaccessible volume. Receiving a selection of one of the inaccessible volume and the accessible volume for synchronizing data to the other of the inaccessible volume and the accessible volume may include receiving a selection of the inaccessible volume for synchronizing data to the accessible volume. Associating each of the inaccessible volume and the accessible volume with one of the first storage protocol identifier and the second storage protocol identifier based upon, at least in part, the selection of one of the inaccessible volume and the accessible volume may include replacing the first storage protocol identifier associated with the accessible volume with the second storage protocol identifier, and synchronizing data from the inaccessible volume to the accessible volume.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
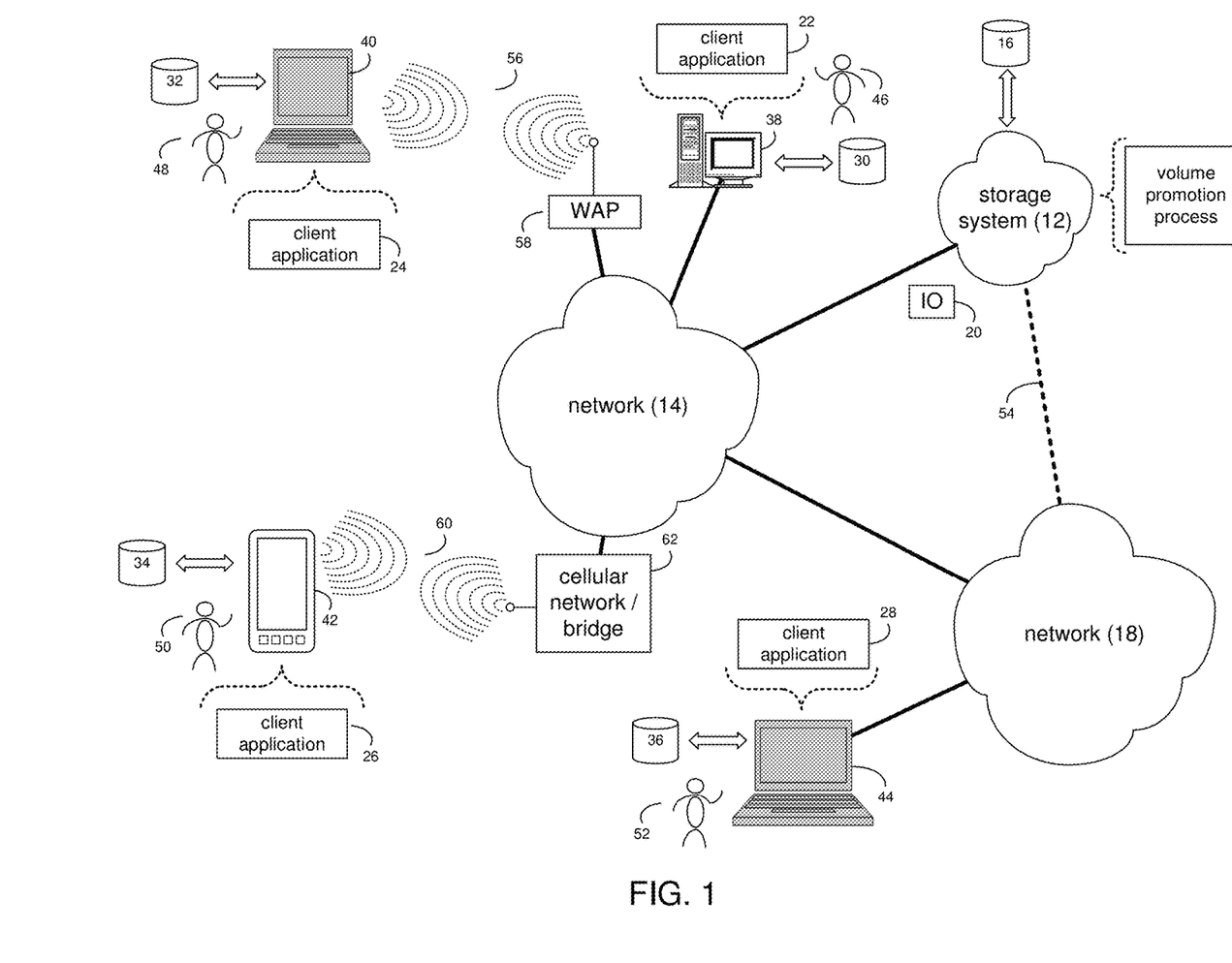
FIG. 1 is an example diagrammatic view of a storage system and a volume promotion process coupled to a distributed computing network according to one or more example implementations of the disclosure.

System Overview:

Referring to FIG. 1, there is shown volume promotion process 10 that may reside on and may be executed by storage system 12, which may be connected to network 14

(e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of volume promotion process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of volume promotion process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a volume promotion process, such as volume promotion process 10 of FIG. 1, may include but is not limited to, identifying a replication link failure between a first volume of a first storage array and a second volume of a second storage array, wherein a first storage protocol identifier is associated with each of the first volume and the second volume. One of the first volume and the second volume may be defined as inaccessible and the other of the first volume and the second volume as accessible, thus defining an inaccessible volume and an accessible volume. The first storage protocol identifier associated with the inaccessible volume may be replaced with a second storage protocol identifier. Access to the inaccessible volume may be provided via the second storage protocol identifier.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
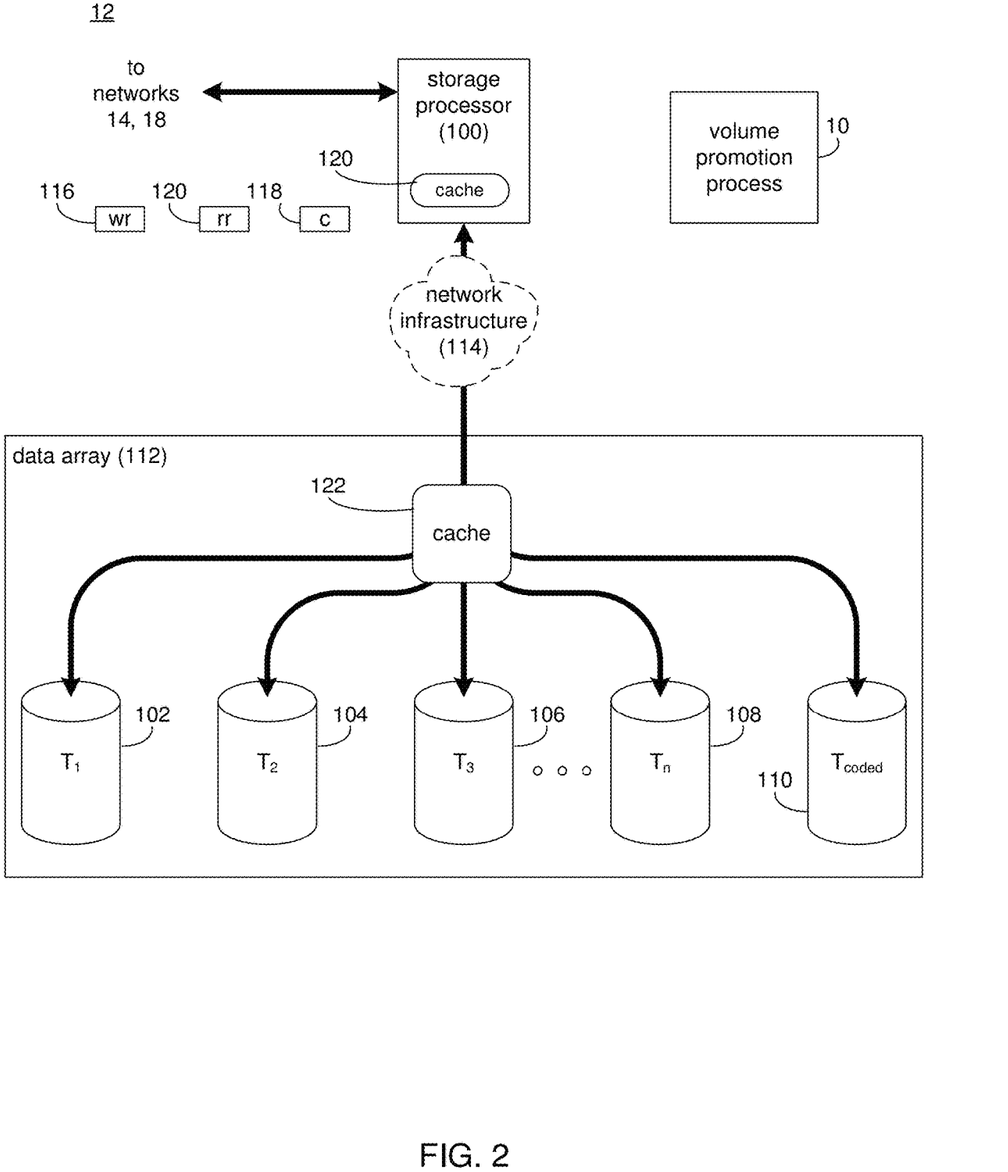
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of volume promotion process 10. The instruction sets and subroutines of volume promotion process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of volume promotion process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these TO requests may be internally generated within storage processor 100. Examples of TO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of volume promotion process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of volume promotion process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
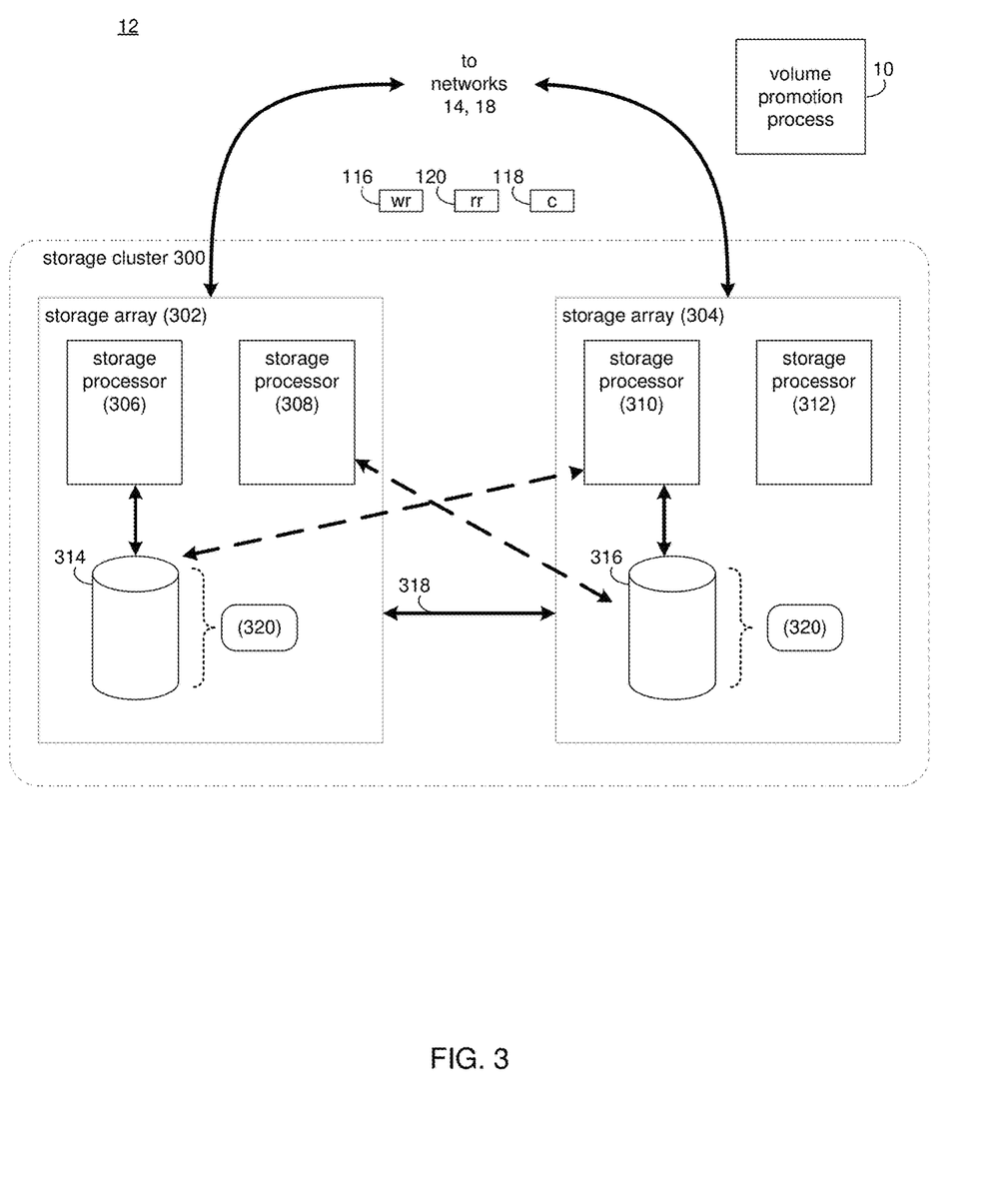

The Storage Cluster:

Referring also to FIG. 3, storage system 12 may include a storage cluster (e.g., storage cluster 300) of storage arrays (e.g., storage arrays 302, 304). A cluster of storage arrays (e.g., storage cluster 300) may generally include a Federation composed of multiple arrays, where each storage arrays (e.g., storage arrays 302, 304) may include one or more connected nodes/storage processors (e.g., storage processors 306, 308, 310, 312) with shared back-end drives (e.g., data array 112) and/or back-end storage arrays running a storage stack that communicate over a network.

Referring again to the example of FIG. 3, each storage array (e.g., storage arrays 302, 304) may utilize various storage protocols (e.g., Small Computer System Interface (SCSI), Fibre Channel, Non-Volatile Memory Express (NVMe) over Fabric (NVMe-oF), etc.) for accessing volumes of a storage system. As is known in the art, NVMe or NVM Express® is a specification defining how host software communicates with non-volatile memory across a PCI Express® (PCIe®) bus. As will be discussed in greater detail below, a storage protocol may generally include standards or protocols for physically connecting and transferring data between computing devices and peripheral devices. In some implementations, a storage protocol path may generally include a hardware and/or software communication link between computing devices and peripheral devices.

In some implementations and as will be discussed in greater detail below, a volume may be configured to be an active/active volume that is accessible from any storage array of a storage cluster. As will be discussed in greater detail below, an active/active volume may include a volume replicated on and accessible by each storage array of a storage cluster. For example, a first volume of a first storage array and a second volume of a second storage array may be maintained to be identical.

In some implementations, host servers can read and write to each storage array of the storage cluster. Any write operation to a volume on one storage array may be replicated to the corresponding volume(s) on the other storage array(s) synchronously, while a read operation on the volume can be serviced by the storage array receiving the read command (e.g., "active/active"). In some implementations, each volume may expose the same SCSI image at each storage array, including a SCSI ID (a world-wide unique identifier), so that a host does not see multiple storage arrays but may see a more recognizable multi-pathing setup with a single volume. In this manner, the volume may be "stretched" across multiple storage arrays.

For example, suppose a volume (e.g., first volume 314) is generated on storage array 302 and is configured to be an active/active volume. In this example, a corresponding volume (e.g., second volume 316) may be generated on storage array 304. In some implementations, each storage array (e.g., storage arrays 302, 304) may be configured to access the active/active volume (e.g., either first volume 314 on storage array 302 or second volume 316 on storage array 304).

As will be discussed in greater detail below, the IO paths of each storage array to a volume may be independent of a replication link between storage arrays. Accordingly, failure of a replication link may not impact the IO paths between a storage array and a volume such that even when a replication link between storage arrays fails, storage arrays may still be able to access the volume. As shown in FIG. 3, cross-links (i.e., a storage array and a volume coupled together from separate sites or locations) between storage arrays and a volume are shown in dashed lines while solid lines between storage arrays and a volume may indicate a direct link (i.e., a storage array and a volume coupled together within the same site or location).

In some implementations, a replication link (e.g., replication link 318) may be configured to communicatively couple multiple storage arrays such that changes to a particular volume (e.g., first volume 314) may be replicated to each corresponding volume on each other storage array (e.g., second volume 316). In this manner, the contents of first volume 314 and second volume 316 may be identical across various storage arrays. As will be discussed in greater detail below, replication links (e.g., replication link 318) may fail and may prevent changes to a particular volume on one storage array from being replicated to the corresponding volumes on each storage array.

The Volume Promotion Process:

Referring also to the examples of FIGS. 4-7 and in some implementations, volume promotion process 10 may identify 400 a replication link failure between a first volume of a first storage array and a second volume of a second storage array, wherein a first storage protocol identifier is associated with each of the first volume and the second volume. One of the first volume and the second volume may be defined 402 as inaccessible and the other of the first volume and the second volume as accessible, thus defining an inaccessible volume and an accessible volume. The first storage protocol identifier associated with the inaccessible volume may be replaced 404 with a second storage protocol identifier. Access to the inaccessible volume may be provided 406 via the second storage protocol identifier.

As will be discussed in greater detail below, implementations of the present disclosure may allow for fractured volumes to be promoted via a change in a storage protocol identifier. As will be discussed in greater detail below, when replication links break or fail between storage arrays, conventional approaches sever the connection between the two copies of the volume as it could be disastrous to continue to service IO operations from both copies of the active/active volume to hosts. For example, any write to one copy of the volume is no longer replicated to its peer. In this manner, the volume becomes "fractured" with an accessible copy and inaccessible copy. Conventional approaches to this challenge designate one storage array as the "winner", enabling it to continue to service IO operations, while the other storage array, the "loser", remains with a frozen, inaccessible copy of the volume.

In some implementations and as will be discussed in greater detail below, after a fracture, it may be desirable to make the volume on the "loser" storage array accessible to hosts. For example, if the storage array including the "winner" volume fails or is in a site that is experiencing a failure. This process of providing access to the "loser" storage array's volume may generally be referred to as "promotion".

In some implementations, even though an active/active volume may be split into two divergent copies, both copies may be configured to carry the same storage protocol identifier. However, it may be dangerous to expose different data through the same storage protocol identifier, since any host that manages to access both divergent copies of the data may get a corrupted view of the volume and may execute write operations that could permanently corrupt the data. As such, according to conventional approaches, it may be difficult to verify that none of the hosts previously connected to the storage array are still connected to the "winner" and the "loser" storage arrays. It may also be difficult to unmap all cross-connections between a "loser" storage array and other storage arrays of a storage cluster.

Accordingly, embodiments of the present disclosure may provide a safe way to expose the inaccessible volume to hosts. As will be discussed in greater detail below, if and when replication links are resumed, embodiments of the present disclosure may allow a user to select which version of the volume to keep and synchronize to the other volume. In this manner, hosts that can access the selected volume may continue to work uninterrupted while the data is synchronized to the other array.

As discussed above and in some implementations, volume promotion process 10 may generate an active/active volume on a plurality of storage arrays of a storage cluster. Referring again to the example of FIG. 3 and in some implementations, volume promotion process 10 may generate an active/active volume (e.g., in response to a request from a host, an internal command within storage cluster 300, etc.) for storage cluster 300. For example, volume promotion process 10 may generate an active/active volume by generating a copy of the active/active volume in each storage array. In this example, volume promotion process 10 may generate first volume 314 in storage array 302 and second volume 316 in storage array 304. While an example of two volumes on two storage arrays has been provided, it will be appreciated that any number of volumes and/or storage arrays may be used within the scope of the present disclosure.

In some implementations, each copy of the active/active volume may appear to be a single volume based upon, at least in part, a common storage protocol identifier for each copy of the active/active volume. As discussed above and in some implementations, a volume may be defined for various storage protocols. For example, when utilizing a SCSI storage protocol, generating a volume may include generating or allocating a first Logical Unit Number (LUN). As is known in the art, a LUN may generally include a number used to identify a logical unit, which is a device addressed by the SCSI protocol. While an example has been provided for LUNs for SCSI storage protocols, it will be appreciated that any storage protocol may be used within the scope of the present disclosure.

In some implementations, generating the active/active volume may include associating one or more storage protocol identifiers with each copy of the active/active volume. A storage protocol identifier may generally include a storage protocol-specific reference to a particular volume or other storage container. As discussed above and in some implementations, various storage protocols may be used to couple a host (e.g., client computing devices 38, 40, 42, 44) to storage devices within a storage array (e.g., storage arrays 302, 304). In one example, the SCSI storage protocol may be utilized to communicatively couple a host to storage devices within a storage array and each volume may be referenced within the SCSI storage protocol by a SCSI ID. As is known in the art, a SCSI ID may be a world-wide unique storage protocol identifier assigned to a particular volume. In this manner, a host may communicate with a volume via the SCSI storage protocol by addressing the SCSI ID of the volume. While an example of a SCSI ID has been provided for a storage protocol identifier, it will be appreciated that other storage protocol identifiers may be used within the scope of the present disclosure.

In some implementations, multiple storage protocol paths may be formed between a host and a volume or other storage container by utilizing a storage protocol identifier. In this manner, volume promotion process 10 may allow for SCSI multipath connections between a host and a storage protocol identifier. Accordingly and as is known in the art per SCSI protocol, volume promotion process 10 may define or generate multiple paths to a single volume by referencing the SCSI ID associated with the volume. In some implementations, the storage cluster may support Asymmetric Logical Unit Access (ALUA) which allows, among other options, for paths to be identified with an ALUA state of "available" or "unavailable." In this manner, paths may be generated to LUNs of a storage array by referencing a storage protocol identifier and may be identified with an ALUA state as either "available" or "unavailable." As will be discussed in greater detail below, these ALUA states may allow paths to be generated referencing a storage protocol identifier but without being associated with a volume.

In some implementations, volume promotion process 10 may associate one or more storage protocol identifiers with the active/active volume. Referring again to the example of FIG. 3 and in some implementations, volume promotion process 10 may associate a first storage protocol identifier (e.g., first storage protocol identifier 320) with each copy of the active/active volume. In this example, volume promotion process 10 may associate the first storage protocol identifier (e.g., first storage protocol identifier 320) with a first volume (e.g., first volume 314) and a second volume (e.g., second volume 316). In one example, the first storage protocol identifier (e.g., first storage protocol identifier 320) may be a SCSI ID. Accordingly, a host may access the contents of an active/active volume by accessing the first storage protocol identifier. In this manner, a host may access either a first copy of the volume (e.g., first volume 314) and/or a second copy of the volume (e.g., second volume 316) by referencing the first storage protocol identifier (e.g., first storage protocol identifier 320).

In some implementations, volume promotion process 10 may identify 400 a replication link failure between a first volume of a first storage array and a second volume of a second storage array, wherein a first storage protocol identifier is associated with each of the first volume and the second volume. As discussed above and in some implementations, storage arrays in a storage cluster may be configured (e.g., via volume promotion process 10) to mirror or otherwise provide operations that modify one copy of the active/active volume to each other copy of the active/active volume. In this manner, each copy of the active/active volume may appear to a host as a single volume. In some implementations, volume promotion process 10 may replicate operations on one volume of one storage array to another volume of another storage array via a replication link. In some implementations, a replication link may generally include a physical and/or software coupling between multiple storage arrays within a storage cluster. In some implementations and for various reasons, a replication link may fail. In such situations, volume promotion process 10 may identify 400 a replication link failure between a first volume of a first storage array and a second volume of a second storage array.

Referring again to the example of FIG. 3 and in some implementations, suppose an active/active volume is generated for storage cluster 300. In this example, volume promotion process 10 may maintain first volume 314 of storage array 302 and second volume 316 of storage array 304 by replicating any operations that modify either first volume 314 or second volume 316 to the other volume via replication link 318.

Figure 5:
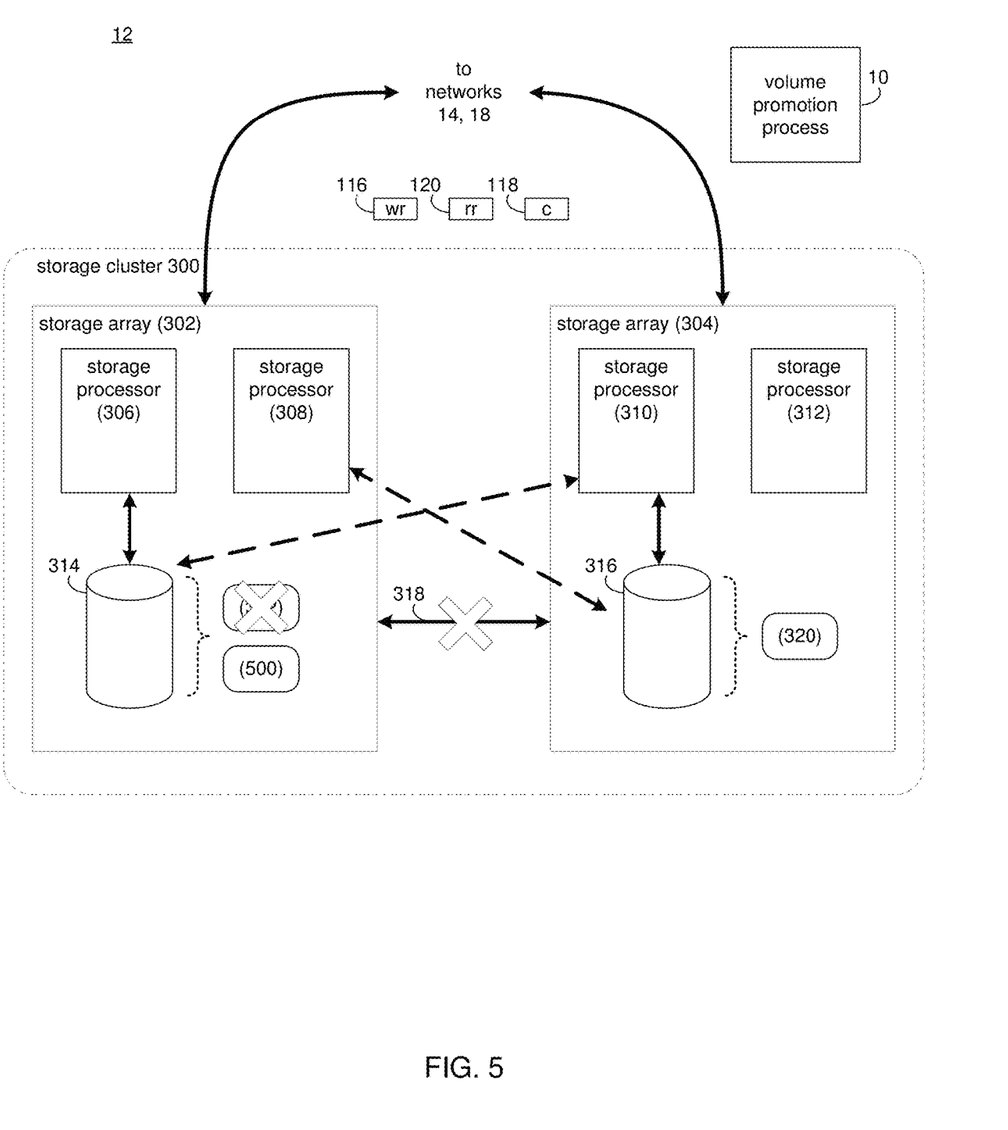
FIGS. 5-7 are example diagrammatic views of the storage system of FIG. 1 according to one or more example implementations of the disclosure.

Referring also to the example of FIG. 5 and in some implementations, suppose replication link 318 fails. In this example, volume promotion process 10 may identify 400 a replication link failure between first volume 314 of storage array 302 and second volume 316 of storage array 304. As will be discussed in greater detail below, with a replication link failure, operations on one volume (e.g., first volume 314) may no longer be synchronized to another volume (e.g., second volume 316) of the active/active volume.

Figure 4:
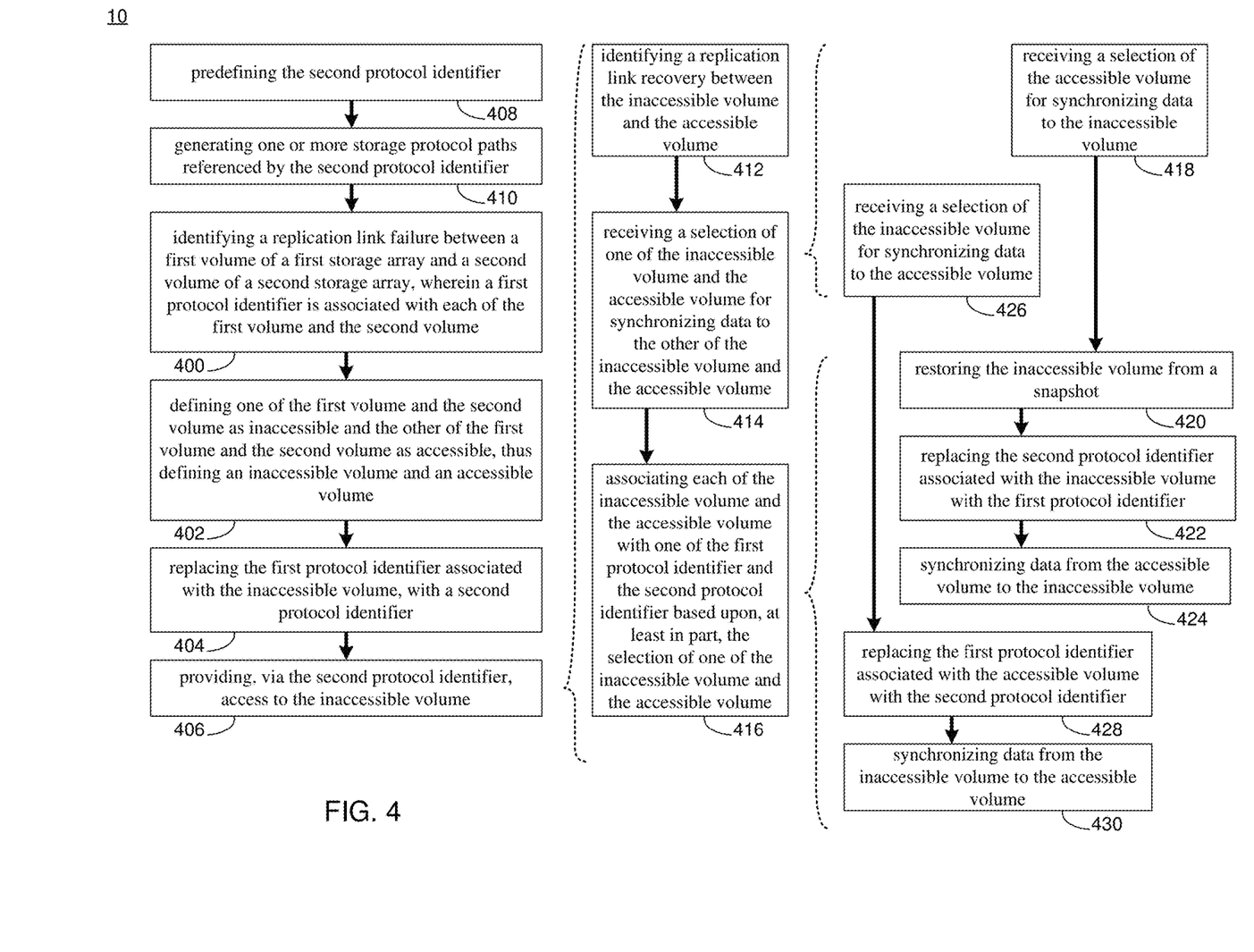
FIG. 4 is an example flowchart of volume promotion process according to one or more example implementations of the disclosure.

In some implementations, volume promotion process 10 may define 402 one of the first volume and the second volume as inaccessible and the other of the first volume and the second volume as accessible, thus defining an inaccessible volume and an accessible volume. As discussed above and in some implementations, in response to identifying 400 a replication link failure between storage arrays, volume promotion process 10 may define or otherwise designate one of the storage arrays as accessible and the other storage arrays as inaccessible. In the example of two storage arrays, volume promotion process 10 may define one storage array as accessible and one storage array as inaccessible. Accordingly, volume promotion process 10 may continue to provide access to the accessible storage array as normal. However, even when a storage array is determined to be inaccessible, storage arrays may be able to access volumes within the inaccessible storage array. Accordingly, volume promotion process 10 may define 402 one of the first volume and the second volume as inaccessible and the other of the first volume and the second volume as accessible. In this manner, volume promotion process 10 may define an inaccessible volume and an accessible volume.

Returning to the example of FIG. 5 and in some implementations, volume promotion process 10 may define 402 one of the first volume (e.g., first volume 314) and the second volume (e.g., second volume 316) as inaccessible and the other volume as accessible. In this example, suppose volume promotion process 10 defines 402 storage array 302 as inaccessible in response to identifying 400 the replication link failure. In some implementations, which storage array is defined as inaccessible may be random, may be user-determined, may be determined based upon, at least in part, various performance metrics associated with each storage array, may be defined leveraging a separate witness/tiebreaker component external to both storage arrays, etc. Accordingly, volume promotion process 10 may define 402 volume 314 as inaccessible because storage array 302 has been defined or designated as inaccessible and may define 402 volume 316 as accessible as storage array 304 is still accessible to the hosts.

In some implementations, volume promotion process 10 may replace 404 the first storage protocol identifier associated with the inaccessible volume, with a second storage protocol identifier. In some implementations, volume promotion process 10 may replace 404 the first storage protocol identifier associated with the inaccessible volume, with a second storage protocol identifier by removing the first storage protocol identifier associated with the inaccessible volume. For example and as discussed above, while a storage array and associated volume(s) may be defined as inaccessible, storage arrays may be able to access the inaccessible volume(s) using the first storage protocol identifier. In this manner, divergent copies of the data of each volume may be provided to one or more hosts. To address these potential issues, volume promotion process 10 may remove the first storage protocol identifier associated with the inaccessible volume. In some implementations, by removing the first storage protocol identifier associated with the inaccessible volume, volume promotion process 10 may prevent hosts from accessing the data of the inaccessible volume. In some implementations, volume promotion process 10 may force all hosts still accessing the first storage protocol identifier to lose any storage protocol paths to the inaccessible volume referenced by the first storage protocol identifier.

In some implementations, volume promotion process 10 may generate a snapshot of the inaccessible volume. As is known in the art, a snapshot is a representation of the state and data of a storage space at a particular time. In some implementations, volume promotion process 10 may generate a snapshot of the inaccessible volume at the time of the replication link failure. As will be discussed in greater detail below and in some implementations, volume promotion process 10 may preserve the state of the active/active volume at the time of the replication link failure by generating a snapshot of the inaccessible volume.

In some implementations, volume promotion process 10 may replace 404 the first storage protocol identifier associated with the inaccessible volume, with a second storage protocol identifier by installing or associating a second storage protocol identifier with the inaccessible volume. As discussed above and in some implementations, each storage protocol identifier may reference a particular set of storage protocol paths from one or more hosts to a particular storage device or volume. As will be discussed in greater detail below, the second storage protocol identifier may be defined before a replication link failure and/or in response to a replication link failure. In this manner, an inaccessible volume may be referenced by a separate storage protocol identifier to avoid data from an inaccessible volume being accessed or modified while the replication link is inoperative.

Referring again to the example of FIG. 5 and in some implementations, volume promotion process 10 may replace 404 the first storage protocol identifier (e.g., first storage protocol identifier 320) associated with the inaccessible volume (e.g., first volume 314), with a second storage protocol identifier (e.g., second storage protocol identifier 500). For example, volume promotion process 10 may remove the first storage protocol identifier (e.g., first storage protocol identifier 320) and may force all hosts to lose their storage protocol paths to the inaccessible volume (e.g., first volume 314) referenced by the first storage protocol identifier (e.g., first storage protocol identifier 320). Volume promotion process 10 may generate a snapshot of the inaccessible volume (e.g., first volume 314) to preserve the state of the active/active volume at the time the replication link failure was identified 400. Volume promotion process 10 may associate the inaccessible volume (e.g., first volume 314) with the second storage protocol identifier (e.g., second storage protocol identifier 500). As will be discussed in greater detail below, volume promotion process 10 may have already defined (i.e., predefined) the second storage protocol identifier (e.g., second storage protocol identifier 500) or may define the second storage protocol identifier (e.g., second storage protocol identifier 500) in response to identifying 400 the replication link failure.

In some implementations, volume promotion process 10 may predefine 408 the second storage protocol identifier. For example and as discussed above, a storage protocol identifier may be defined without being associated with a volume. In some implementations, predefining 408 the second storage protocol identifier may include defining the second storage protocol identifier at any point in time prior to a replication link failure. For example and in some implementations, volume promotion process 10 may define the second storage protocol identifier at initialization of the storage system. In some implementations, volume promotion process 10 may define the second storage protocol when generating an active/active volume. For example, when generating an active/active volume and defining a first storage protocol identifier to be associated with each copy of the volume on each storage array, volume promotion process 10 may define the second storage protocol identifier. While several examples of when the second storage protocol identifier may be predefined 408, it will be appreciated that the second storage protocol identifier may be defined at any point in time prior to a replication link failure.

In some implementations, volume promotion process 10 may generate 410 one or more storage protocol paths referenced by the second storage protocol identifier. In some implementations, when predefining 408 the second storage protocol identifier, volume promotion process 10 may generate 410 one or more storage protocol paths referenced by the second storage protocol identifier. For example, unlike the first storage protocol identifier which may be defined and associated with a volume when generating the volume, volume promotion process 10 may define a second storage protocol identifier without associating the second storage protocol identifier with a volume. As discussed above and in some implementations, volume promotion process 10 may generate 410 one or more new storage protocol paths with one or more new LUN numbers, exposing the second storage protocol identifier. In this manner, volume promotion process 10 may generate one or more storage protocol paths to the one or more LUNs referenced by the second storage protocol without associating the second storage protocol identifier with a volume. Accordingly, the second storage protocol identifier may be associated with a volume in response to removing the first storage protocol identifier from the volume.

In some implementations where the storage system utilizes ALUA, volume promotion process 10 may define the ALUA state of the one or more storage protocol paths referenced by the second storage protocol identifier as "unavailable." As is known in the art, when a storage protocol path has an ALUA state of "unavailable", the storage protocol path may be defined but inaccessible until the ALUA state is changed to "available." In some implementations, by defining the ALUA state of the one or more storage protocol paths referenced by the second storage protocol identifier as "unavailable", volume promotion process 10 may be configured to replace 404 the first storage protocol identifier associated with the inaccessible volume without requiring hosts to scan for new storage protocol paths.

Referring again to the example of FIG. 5 and in some implementations, volume promotion process 10 may predefine 408 a second storage protocol identifier (e.g., second storage protocol identifier 500) when an active/active volume is generated. In this example, volume promotion process 10 may generate 410 one or more storage protocol paths referenced by the second storage protocol identifier (e.g., second storage protocol identifier 500). In some implementations and in response to identifying 400 the replication link failure and removing the first storage protocol identifier (e.g., first storage protocol identifier 320), volume promotion process 10 may replace 404 the first storage protocol identifier (e.g., first storage protocol identifier 320) with the second storage protocol identifier (e.g., second storage protocol identifier 500). In this example where second storage protocol identifier 500 is predefined 408, volume promotion process 10 may provide 406, via second storage protocol identifier 500, access to the inaccessible volume (e.g., first volume 314) by changing the ALUA state associated with the one or more storage protocol paths referenced by second storage protocol identifier 500 from "unavailable" to "available." In this manner, hosts may access first volume 126 via second storage protocol identifier 500 without requiring the hosts to scan for new storage protocol paths.

In some implementations and as discussed above, volume promotion process 10 may define the second storage protocol identifier in response to identifying 400 the replication link failure. Referring again to the example of FIG. 5 and in some implementations, volume promotion process 10 may define second storage protocol identifier 500 in response to identifying 400 the replication link failure of replication link 318.

In some implementations, volume promotion process 10 may force a host to rescan the storage protocol paths. For example, when the first storage protocol identifier is replaced 404 with a second storage protocol identifier that is defined in response to identifying 400 the replication link failure, storage protocol paths may not be generated or mapped between hosts and the inaccessible volume now associated with the second storage protocol identifier. In this example, volume promotion process 10 may replace 404 the first storage protocol identifier with the second storage protocol identifier, as described above, without changing LUN numbers. Volume promotion process 10 may mark each I-T nexus for resetting by the host. As is known in the art, an I-T nexus is a relationship in the SCSI protocol between a SCSI Initiator Port and a SCSI Target Port of a storage protocol path. For example, volume promotion process 10 may mark each I-T nexus with "reset required." Volume promotion process 10 may change the ALUA state to an "available" state. Accordingly, on each IO operation sent to the one or more first storage protocol paths, volume promotion process 10 may examine the first storage protocol path the IO operation came from. If it is marked as "reset required", volume promotion process 10 may return a storage protocol reset (e.g., SCSI Reset), forcing the host (in particular, multi-pathing software of the host) to rescan all LUNs of the storage array to generate one or more storage protocol paths referencing the second storage protocol identifier to the inaccessible volume. Otherwise, volume promotion process 10 may let the IO operation proceed normally.

In some implementations, this approach may ensure that the host will not send IO operations to a storage protocol path with the first storage protocol identifier, and receive results from a volume with a different storage protocol identifier. In some implementations, the type of reset sent back to the host may depend on the operating system and/or the multi-pathing software of the host.

In some implementations, volume promotion process 10 may provide 406, via the second storage protocol identifier, access to the inaccessible volume. For example, volume promotion process 10 may allow hosts to access the inaccessible volume via the second storage protocol identifier. In this manner, volume promotion process 10 may prevent hosts from inadvertently performing operations on the inaccessible volume believing that the inaccessible volume is part of the active/active volume. Accordingly, volume promotion process 10 may "promote" the inaccessible volume.

In some implementations, volume promotion process 10 may provide 406, via the second storage protocol identifier, access to the inaccessible volume in response to the accessible storage array failing, if the accessible storage array is located in a site experiencing a failure, etc. In this manner, volume promotion process 10 may allow hosts to access the data of the inaccessible volume. Referring again to the example of FIG. 5 and in some implementations, volume promotion process 10 may provide 406, via second storage protocol identifier 500, access to first volume 314.

In some implementations, providing 406 access to the inaccessible volume via the second storage protocol identifier may include identifying 412 a replication link recovery between the inaccessible volume and the accessible volume. As discussed above and in some implementations, it may be desirable to restore the active/active volume formed from synchronized copies of the volume on each storage array. In some implementations, volume promotion process 10 may identify 412 a replication link recovery between the inaccessible storage array and the accessible storage array(s). Accordingly, the inaccessible volume of the inaccessible storage array and the accessible volume of the accessible storage array, may be synchronized via the recovered replication link. In some implementations, the replication link recovery may be manually performed by a user or performed automatically by volume promotion process 10. In one example, upon detection of the replication link, volume promotion process 10 may prompt a user interface or a graphical user interface to determine whether the user would like to restore the replication link between the inaccessible volume and the accessible volume.

In some implementations, providing 406 access to the inaccessible volume via the second storage protocol identifier may include receiving 414 a selection of one of the inaccessible volume and the accessible volume for synchronizing data to the other of the inaccessible volume and the accessible volume. In some implementations, it may be desirable, in various circumstances, to synchronize the data of the active/active volume to the most current state of the inaccessible volume. It may also be desirable, in various circumstances, to synchronize the data of the active/active volume to the most current state of the accessible volume. Accordingly, volume promotion process 10 may receive 414 a selection of one of the inaccessible volume and the accessible volume for synchronizing data to the other volume. In some implementations, volume promotion process 10 may prompt a user with a user interface or a graphical user interface to select which volume to use for synchronizing to the other volume. In some implementations, volume promotion process 10 may provide an option for synchronizing the data from the inaccessible volume to the accessible volume and an option for synchronizing the data from the accessible volume to the inaccessible volume.

In some implementations, providing 406 access to the inaccessible volume via the second storage protocol identifier may include associating 416 each of the inaccessible volume and the accessible volume with one of the first storage protocol identifier and the second storage protocol identifier based upon, at least in part, the selection of one of the inaccessible volume and the accessible volume. In some implementations and as discussed above, by replacing 404 the first storage protocol identifier associated with the inaccessible volume, with the second storage protocol identifier, volume promotion process 10 may prevent inadvertent data corruption from a storage array performing operations on the inaccessible volume intended for the accessible volume. However, to restore the active/active configuration of the volume, volume promotion process 10 may associate 416 each of the inaccessible volume and the accessible volume with the same storage protocol identifier (e.g., the first storage protocol identifier or the second storage protocol identifier). In this manner and as discussed above, hosts may access either copy of the active/active volume by referencing the common storage protocol identifier. As will be discussed in greater detail below, volume promotion process 10 may associate 416 each copy of the volume with either the first storage protocol identifier or the second storage protocol identifier based upon, at least in part, the selection of the volume to synchronize data from.

In some implementations, receiving 414 a selection of one of the inaccessible volume and the accessible volume for synchronizing data to the other of the inaccessible volume and the accessible volume may include receiving 418 a selection of the accessible volume for synchronizing data to the inaccessible volume. In some implementations, a user may desire to synchronize the inaccessible volume with the contents of the accessible volume by selecting the accessible volume.

In some implementations, associating 416 each of the inaccessible volume and the accessible volume with one of the first storage protocol identifier and the second storage protocol identifier based upon, at least in part, the selection of one of the inaccessible volume and the accessible volume may include restoring 420 the inaccessible volume from a snapshot. As discussed above and in some implementations, volume promotion process 10 may restore 420 the inaccessible volume from a snapshot generated at the time the replication link failed.

In some implementations, associating 416 each of the inaccessible volume and the accessible volume with one of the first storage protocol identifier and the second storage protocol identifier based upon, at least in part, the selection of one of the inaccessible volume and the accessible volume may include replacing 422 the second storage protocol identifier associated with the inaccessible volume with the first storage protocol identifier. As discussed above, volume promotion process 10 may replace 422 the second storage protocol identifier associated with the inaccessible volume with the first storage protocol identifier. In this manner, the active/active volume may be accessible to hosts by referencing the first storage protocol identifier. In some implementations, volume promotion process 10 may keep the second storage protocol identifier for future replication link failures and volume fractures.

In some implementations, associating 416 each of the inaccessible volume and the accessible volume with one of the first storage protocol identifier and the second storage protocol identifier based upon, at least in part, the selection of one of the inaccessible volume and the accessible volume may include synchronizing 424 data from the accessible volume to the inaccessible volume. In some implementations, data from the accessible volume may be synchronized 424 to the inaccessible volume until the inaccessible volume is identical to the accessible volume.

Figure 6:
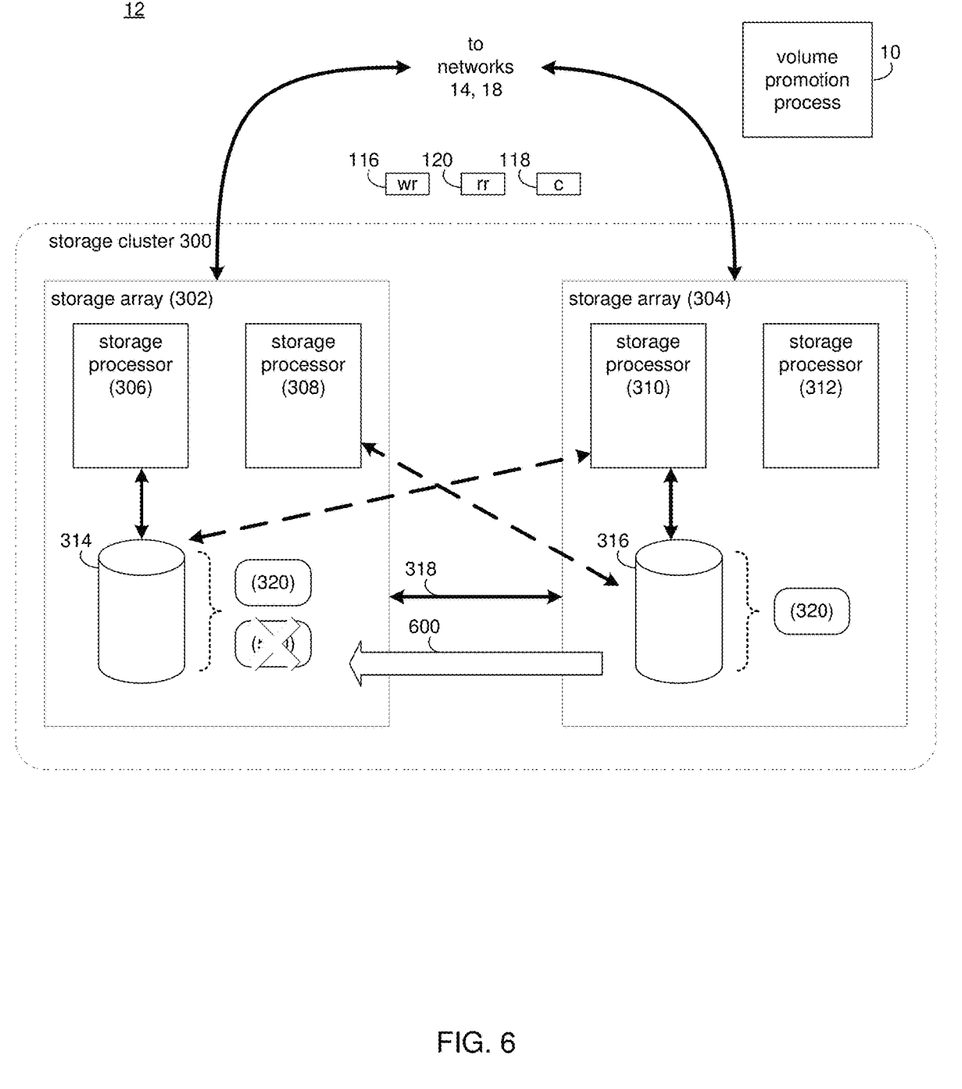

Referring also to the example of FIG. 6 and in some implementations, suppose volume promotion process 10 receives 418 a selection of the accessible volume (e.g., second volume 316) for synchronizing data from the accessible volume (e.g., second volume 316) to the inaccessible volume (e.g., first volume 314). In this example, volume promotion process 10 may restore 420 the inaccessible volume (e.g., first volume 314) from the snapshot generated at the time the replication link (e.g., replication link 318) failed. Volume promotion process 10 may replace 422 the second storage protocol identifier (e.g., second storage protocol identifier 500) with the first storage protocol identifier (e.g., first storage protocol identifier 320). Volume promotion process 10 may synchronize 424 data (e.g., represented by arrow 600) from the accessible volume (e.g., second volume 316) to the inaccessible volume (e.g., first volume 314). In this example, inaccessible volume 314 may be synchronized 424 to be identical to accessible volume 316. Volume promotion process 10 may maintain the active/active configuration between first volume 314 and second volume 316 by replicating operations performed on either volume to the other volume via replication link 318.

In some implementations, receiving 414 a selection of one of the inaccessible volume and the accessible volume for synchronizing data to the other of the inaccessible volume and the accessible volume may include receiving 426 a selection of the inaccessible volume for synchronizing data to the accessible volume. In some implementations, a user may desire to synchronize the accessible volume with the contents of the inaccessible volume by selecting the inaccessible volume.

In some implementations, associating 416 each of the inaccessible volume and the accessible volume with one of the first storage protocol identifier and the second storage protocol identifier based upon, at least in part, the selection of one of the inaccessible volume and the accessible volume may include replacing 428 the first storage protocol identifier associated with the accessible volume with the second storage protocol identifier. In some implementations, volume promotion process 10 may replace 428 the first storage protocol identifier associated with the accessible volume with the second storage protocol identifier. In this manner, the active/active volume may be accessible to hosts by referencing the second storage protocol identifier. In some implementations, volume promotion process 10 may keep the first storage protocol identifier for future replication link failures and volume fractures.

In some implementations, associating 416 each of the inaccessible volume and the accessible volume with one of the first storage protocol identifier and the second storage protocol identifier based upon, at least in part, the selection of one of the inaccessible volume and the accessible volume may include synchronizing 430 data from the inaccessible volume to the accessible volume. In some implementations, data from the inaccessible volume may be synchronized 430 to the accessible volume until the accessible volume is identical to the inaccessible volume.

Figure 7:
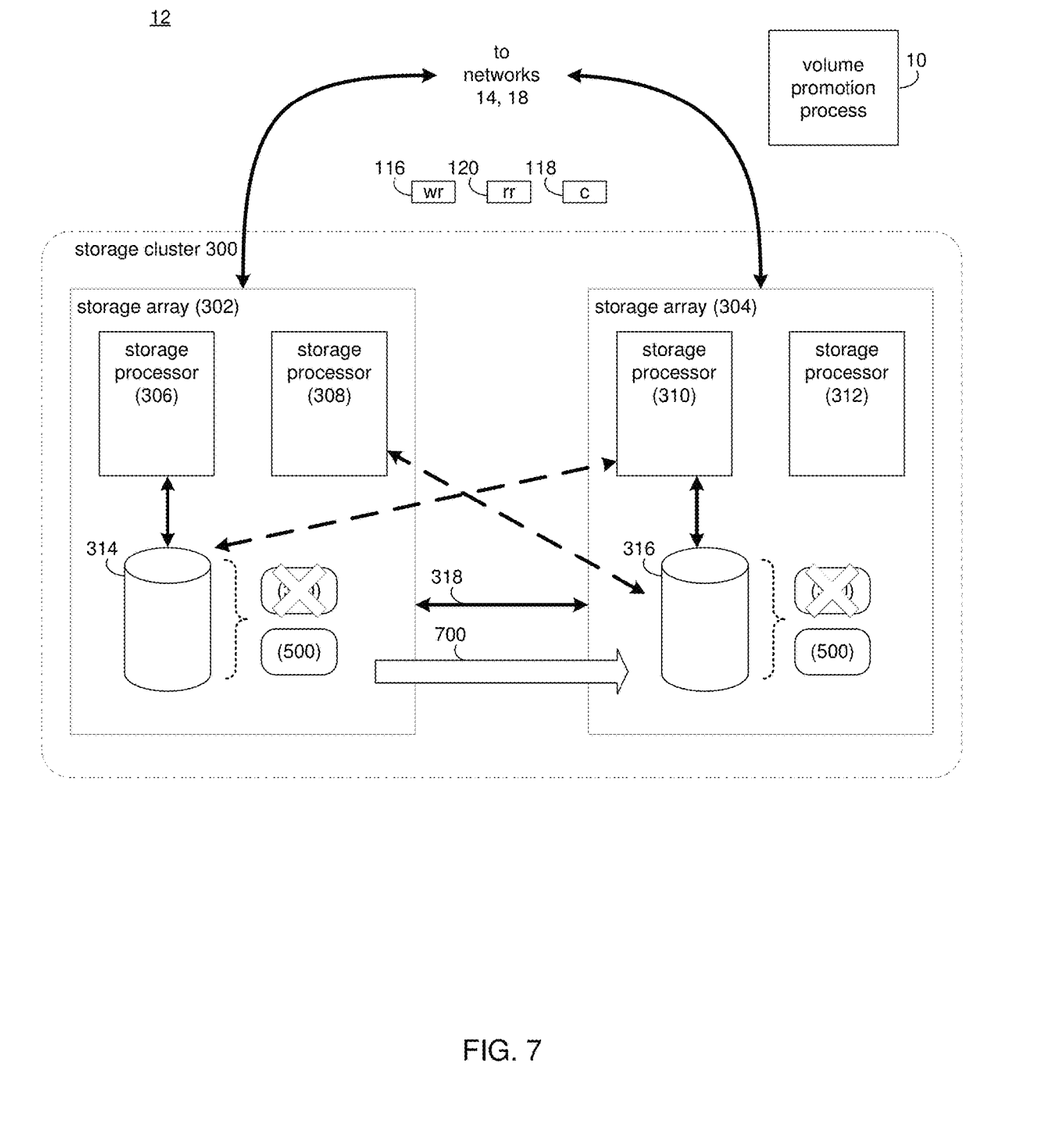

Referring also to the example of FIG. 7 and in some implementations, suppose volume promotion process 10 receives 426 a selection of the inaccessible volume (e.g., first volume 314) for synchronizing data from the inaccessible volume (e.g., first volume 314) to the accessible volume (e.g., second volume 316). In this example, volume promotion process 10 may replace 428 the first storage protocol identifier (e.g., first storage protocol identifier 320) associated with the accessible volume (e.g., second volume 316) with the second storage protocol identifier (e.g., second storage protocol identifier 500). Volume promotion process 10 may synchronize 430 data (e.g., represented by arrow 700) from the inaccessible volume (e.g., first volume 314) to the accessible volume (e.g., second volume 316). In this example, accessible volume 316 may be synchronized 430 to be identical to inaccessible volume 314. Volume promotion process 10 may maintain the active/active configuration between first volume 314 and second volume 316 by replicating operations performed on either volume to the other volume via replication link 318.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of d features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    identifying a replication link failure between a first volume of a first storage array and a second volume of a second storage array, wherein a first storage protocol identifier is associated with each of the first volume and the second volume;
    defining one of the first volume and the second volume as inaccessible and the other of the first volume and the second volume as accessible, thus defining an inaccessible volume and an accessible volume;
    replacing the first storage protocol identifier associated with the inaccessible volume, with a second storage protocol identifier, wherein replacing the first storage protocol identifier associated with the inaccessible volume includes forcing all hosts accessing the inaccessible volume using the first storage protocol identifier to lose all storage protocol paths to the inaccessible volume referenced by the first storage protocol identifier; and
    providing, via the second storage protocol identifier, access to the inaccessible volume, wherein providing access to the inaccessible volume via the second storage protocol identifier includes:
        identifying a replication link recovery between the inaccessible volume and the accessible volume;
        receiving a selection of the accessible volume for synchronizing data to the inaccessible volume;
        associating each of the inaccessible volume and the accessible volume with one of the first storage protocol identifier and the second storage protocol identifier based upon, at least in part, the selection of the accessible volume, wherein associating each of the inaccessible volume and the accessible volume with one of the first storage protocol identifier and the second storage protocol identifier includes:
            restoring the inaccessible volume from a snapshot
            replacing the second storage protocol identifier associated with the inaccessible volume with the first storage protocol identifier; and
            synchronizing data from the accessible volume to the inaccessible volume.

2. The computer-implemented method of claim 1, further comprising:
    predefining the second storage protocol identifier; and
    generating one or more storage protocol paths referenced by the second storage protocol identifier.

3. The computer-implemented method of claim 1, further comprising:
    receiving a selection of the inaccessible volume for synchronizing data to the accessible volume.

4. The computer-implemented method of claim 3, wherein associating each of the inaccessible volume and the accessible volume with one of the first storage protocol identifier and the second storage protocol identifier based upon, at least in part, the selection of one of the inaccessible volume and the accessible volume includes:
    replacing the first storage protocol identifier associated with the accessible volume with the second storage protocol identifier; and
    synchronizing data from the inaccessible volume to the accessible volume.

5. A non-transitory computer readable medium comprising computer readable program code, which when executed by a computer processor enables the computer processor to perform operations comprising:
    identifying a replication link failure between a first volume of a first storage array and a second volume of a second storage array, wherein a first storage protocol identifier is associated with each of the first volume and the second volume;
    defining one of the first volume and the second volume as inaccessible and the other of the first volume and the second volume as accessible, thus defining an inaccessible volume and an accessible volume;
    replacing the first storage protocol identifier associated with the inaccessible volume, with a second storage protocol identifier; and
    providing, via the second storage protocol identifier, access to the inaccessible volume, wherein providing access to the inaccessible volume via the second storage protocol identifier includes:
        identifying a replication link recovery between the inaccessible volume and the accessible volume;
        receiving a selection of the accessible volume for synchronizing data to the inaccessible volume;
        associating each of the inaccessible volume and the accessible volume with one of the first storage protocol identifier and the second storage protocol identifier based upon, at least in part, the selection of the accessible volume, wherein associating each of the inaccessible volume and the accessible volume with one of the first storage protocol identifier and the second storage protocol identifier includes:
            restoring the inaccessible volume from a snapshot;
            replacing the second storage protocol identifier associated with the inaccessible volume with the first storage protocol identifier; and
            synchronizing data from the accessible volume to the inaccessible volume.

6. The non-transitory computer readable medium of claim 5, wherein the operations further comprise:
    predefining the second storage protocol identifier; and
    generating one or more storage protocol paths referenced by the second storage protocol identifier.

7. The non-transitory computer readable medium of claim 5, further comprising:
    receiving a selection of the inaccessible volume for synchronizing data to the accessible volume.

8. The non-transitory computer readable medium of claim 7, wherein associating each of the inaccessible volume and the accessible volume with one of the first storage protocol identifier and the second storage protocol identifier based upon, at least in part, the selection of one of the inaccessible volume and the accessible volume includes:
    replacing the first storage protocol identifier associated with the accessible volume with the second storage protocol identifier; and
    synchronizing data from the inaccessible volume to the accessible volume.

9. A computing system comprising:
a memory; and
a processor configured to identify a replication link failure between a first volume of a first storage array and a second volume of a second storage array, wherein a first storage protocol identifier is associated with each of the first volume and the second volume, wherein the processor is further configured to define one of the first volume and the second volume as inaccessible and the other of the first volume and the second volume as accessible, thus defining an inaccessible volume and an accessible volume, wherein the processor is further configured to replace the first storage protocol identifier associated with the inaccessible volume, with a second storage protocol identifier, and wherein the processor is further configured to provide, via the second storage protocol identifier, access to the inaccessible volume, wherein providing access to the inaccessible volume via the second storage protocol identifier includes: identifying a replication link recovery between the inaccessible volume and the accessible volume, receiving a selection of the inaccessible volume for synchronizing data to the accessible volume, associating each of the inaccessible volume and the accessible volume with one of the first storage protocol identifier and the second storage protocol identifier based upon, at least in part, the selection of one of the inaccessible volume and the accessible volume, wherein associating each of the inaccessible volume and the accessible volume with the second storage protocol identifier includes: replacing the first storage protocol identifier associated with the accessible volume with the second storage protocol identifier, and synchronizing data from the inaccessible volume to the accessible volume.

10. The computing system of claim 9, wherein the processor is further configured to:
    predefine the second storage protocol identifier; and
    generate one or more storage protocol paths referenced by the second storage protocol identifier.

11. The computing system of claim 9, further comprising:
    receiving a selection of the accessible volume for synchronizing data to the inaccessible volume.

12. The computing system of claim 11, wherein associating each of the inaccessible volume and the accessible volume with one of the first storage protocol identifier and the second storage protocol identifier based upon, at least in part, the selection of one of the inaccessible volume and the accessible volume includes:
    restoring the inaccessible volume from a snapshot;
    replacing the second storage protocol identifier associated with the inaccessible volume with the first storage protocol identifier; and
    synchronizing data from the accessible volume to the inaccessible volume.

\* \* \* \* \*